B. R. WRIGHT.
CENTRIFUGAL CLARIFIER AND FILTER.
APPLICATION FILED SEPT. 23, 1911.
1,032,641.
Patented July 16, 1912.
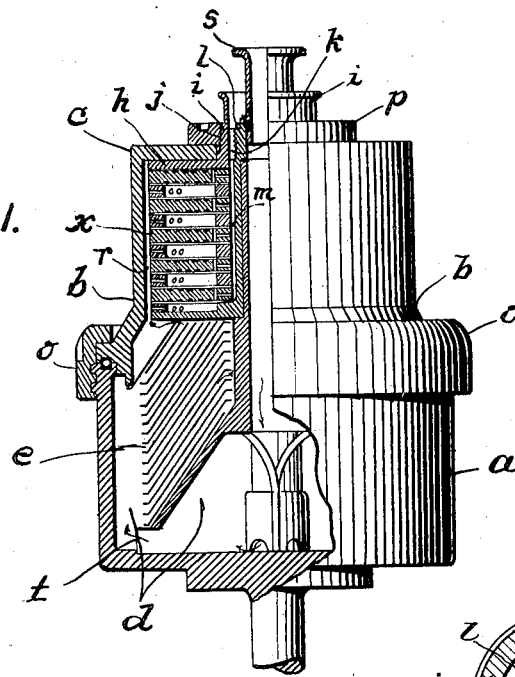
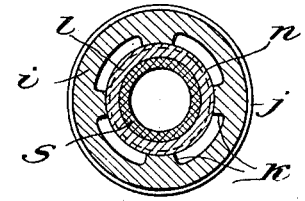
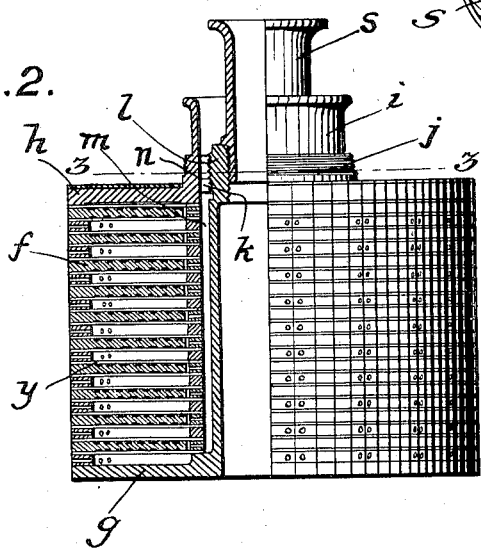
WITNESSES:
INVENTOR
Bert R. Wright
BY
Harding & Harding
ATTORNEYS.

UNITED STATES PATENT OFFICE.

BERT R. WRIGHT, OF POUGHKEEPSIE, NEW YORK, ASSIGNOR TO THE DE LAVAL SEPARATOR COMPANY, A CORPORATION OF NEW JERSEY.

CENTRIFUGAL CLARIFIER AND FILTER.

1,032,641.  Specification of Letters Patent.  Patented July 16, 1912.

Application filed September 23, 1911. Serial No. 650,866.

*To all whom it may concern:*

Be it known that I, BERT R. WRIGHT, a citizen of the United States, residing at Poughkeepsie, county of Dutchess, and State of New York, have invented a new and useful Improvement in Centrifugal Clarifiers and Filters, of which the following is a full, clear, and exact description, reference being had to the accompanying drawings, which form a part of this specification.

My invention relates to certain improvements in centrifugal clarifiers and filters, such as are shown and described and claimed in Letters Patent of the United States, No. 955,890, issued to Thomas B. Marshall, April 26th, 1910. In general, such clarifiers and filters comprise a rotatable bowl, having two compartments, one compartment being devoid of filtering material and the other compartment having layers of filtering material. The liquid to be clarified and filtered is first acted on in the compartment devoid of filtering material, where there is removed a greater portion of the deleterious material. The liquid then passes into the second compartment, in which is the filtering material, where the clarification and filtration is completed.

In practice, the first compartment receives so large an amount of the deleterious material as to require cleaning before the filtering material in the second compartment becomes so affected as to require cleansing or removal. Where, in the construction such as disclosed in the patent hereinbefore mentioned, the two compartments are so arranged in the bowl that the filtering material is required to be inserted and removed from the filtering compartment without disconnecting the chambers from the bowl, two difficulties arise, one the proper insertion of the filtering material, the other the liability of spoiling the filtering material when it is necessary for its removal to cleanse the other compartment.

It is the object of my invention to produce a clarifier and filter of this type, in which these defects will be obviated. In general, I accomplish this result by forming a filter separate from the filtering compartment which is inserted and secured as a unit in the filtering compartment. Further, when it is necessary to cleanse the compartment devoid of filtering material, this filter is bodily, and as a unit, removed, and thus the filtering material is retained intact. When it is desired to change the filter, it is bodily removed from the compartment, separated and rebuilt with fresh material. This, with details whereby this arrangement may be carried out with simplicity, constitutes my invention.

I will first describe the embodiment of my invention shown in the accompanying drawings and then point out the invention in the claims.

Figure 1 is a partial section of an apparatus embodying my invention. Fig. 2 is an enlarged partial section of the filtering compartment. Fig. 3 is a section on the line 3—3, Fig. 2.

$a$ is a rotatable bowl, having the neck $b$ and the hood $c$.

$d$ is one compartment of the bowl, the compartment devoid of filtering material. $e$ is a liner in said compartment, said liner being formed of superimposed plates. The filtering compartment $x$ contains a unitary filter formed of layers of plates $f$ and interposed filtering material $y$.

$g$ is the bottom plate of the filter and $h$ is the top plate of this filter. This top plate $h$ has the tubular extension $i$, having the external thread $j$ and an internal broken thread $k$.

$s$ is the central receiving tube.

$l$ is a sleeve surrounding the receiving tube $s$, having a space or passage $m$ between it and the filter.

$n$ is a thread on the exterior of the sleeve $l$. This thread $n$ meshes with the interior thread of the tubular extension $i$.

$o$ is a lock nut connecting the bowl neck and the bowl proper.

$p$ is a lock nut which rests on the top of the bowl hood and the thread of which extends through an orifice in the bowl hood. This nut meshes with the thread $j$. The filter, separate from the bowl, is shown in Fig. 2, and in position in the bowl in Fig. 1. By releasing the locking nuts $o$ and $p$, the filter as a unit may readily be removed for the purpose of filling up or while the other compartment is being cleansed. When in position in the bowl, there is a space or passage $r$ between the outer end of the filter and the wall of the bowl.

In operation, the liquid enters through the receiving tube $s$ and drops to the bottom of the compartment $d$, where considerable sediment is retained. It is then forced outward by centrifugal force through openings *t* at the bottom to the periphery of the compartment, where the bulk of the heavy sediment settles. The liquid is next drawn toward the center between the several plates. These plates divide the liquid into thin layers, thus the friction on the plates above and below causes it to revolve rapidly, and the heavier part or balance of the sediment is gradually forced to the under side of the plate above and thence down and out to the space between ends of the plates and the periphery of the bowl. The clarified liquid passes toward the center and is forced upward and out into the space or passage *r* of the filtering compartment. The liquid passes from this passage into the several sections of the filter compartment, where it is forced through the filtering material. The filtered liquid finally passes through passage *m* to the outlet.

Having now fully described my invention, what I claim and desire to protect by Letters Patent is—

1. A filter and clarifier, comprising two compartments, one of said compartments being devoid of filtering material, a filter formed independent of the other compartment, means to secure said filter, as a unit, in said compartment and allow the removal therefrom as a unit.

2. A filter and clarifier, comprising a rotatable bowl, having two compartments, one of which contains a filter, formed separate from and independent of the bowl, and means to secure said filter, as a unit, in said compartment, and allow its removal therefrom, as a unit.

3. A filter and clarifier, comprising a rotatable bowl, having two compartments, one of which is a clarifying compartment and the other a filtering compartment, a filter formed separate from and independent of the bowl in the filtering compartment, and means to secure said filter in said compartment, as a unit, and allow its removal therefrom, as a unit.

4. In combination, a filter and clarifier, a rotatable bowl, a compartment thereof devoid of filtering material, a compartment containing superimposed plates and interposed filtering material, a tubular extension from said compartment having interior and exterior threads, a sleeve between said compartment and the feed, said sleeve having a thread meshing with the outer thread of the tubular extension and a lock nut for securing the compartment to the bowl, coacting with the exterior thread on the extension.

5. In combination, a filter and clarifier, a rotatable bowl, a compartment thereof devoid of filtering material, a compartment containing superimposed plates and interposed filtering material, a tubular extension from said compartment having interior and exterior threads, a sleeve between said compartment and the feed, said sleeve having a broken thread meshing with the outer thread of the tubular extension and a lock nut for securing the compartment to the bowl, coacting with the exterior thread on the extension.

6. A filter and clarifier, comprising a rotatable bowl, having two compartments, one of said compartments being devoid of filtering material, a filter in the second filtering compartment, said filter being formed of horizontal layers of filtering material, secured together to form a unitary structure, said filter being secured in the filtering compartment, so as to be insertible and removable as a unit.

In testimony of which invention, I have hereunto set my hand, at Poughkeepsie, on this 22 day of August, 1911.

BERT R. WRIGHT.

Witnesses:
EDWARD K. HAAS,
JOHN B. GRUBB.